Feb. 1, 1927.

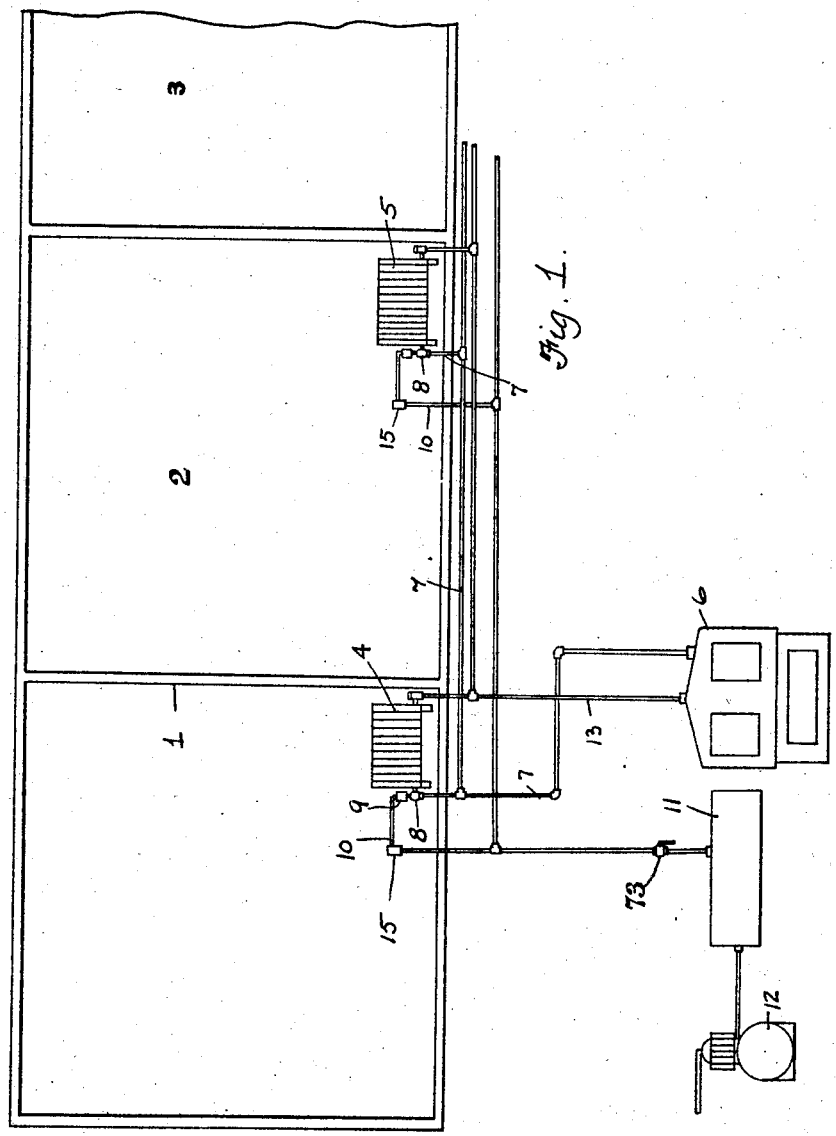

F. K. BEZZENBERGER ET AL 1,615,825

THERMOSTAT FOR HEATING SYSTEMS

Filed Nov. 26, 1924

5 Sheets-Sheet 2

INVENTORS
Fred K. Bezzenberger and
BY William R. Zimmerman
Fay, Oberlin & Fay
ATTORNEYS Feb. 1, 1927.

F. K. BEZZENBERGER ET AL 1,615,825

THERMOSTAT FOR HEATING SYSTEMS

Filed Nov. 26, 1924   5 Sheets-Sheet 3

INVENTORS
Fred K. Bezzenberger and
BY William R. Zimmerman

Fay. Oberlin & Fay
ATTORNEYS

Feb. 1, 1927.

F. K. BEZZENBERGER ET AL 1,615,825

THERMOSTAT FOR HEATING SYSTEMS

Filed Nov. 26, 1924    5 Sheets-Sheet 4

INVENTORS
Fred K. Bezzenberger and
BY William R. Zimmerman.
Fay, Oberlin & Fay
ATTORNEYS Inventors
Fred K. Bezzenberger and
William R. Zimmerman
BY Fay, Oberlin + Fay
Attorneys.

Patented Feb. 1, 1927.

1,615,825

UNITED STATES PATENT OFFICE.

FRED K. BEZZENBERGER, OF CLEVELAND HEIGHTS, AND WILLIAM R. ZIMMERMAN, OF CLEVELAND, OHIO, ASSIGNORS TO THE BISHOP AND BABCOCK COMPANY, OF CLEVELAND, OHIO, A CORPORATION OF OHIO.

THERMOSTAT FOR HEATING SYSTEMS.

Application filed November 26, 1924. Serial No. 752,377.

The present invention, relating, as indicated, to thermostats for heating systems is more particularly directed to an improved type of thermostat for use in a heating system for buildings where it is desired to operate the entire system during certain portions of the day and a part only of the system at other times, and also to a method and apparatus for effecting such operation of a heating system. A further object of the invention is the provision of a simple thermostatic instrument for controlling the flow of air or other operating fluid in such a system for effecting the operation of the various control valves disposed in the inlet lines leading to the radiators. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—

Figure 3:
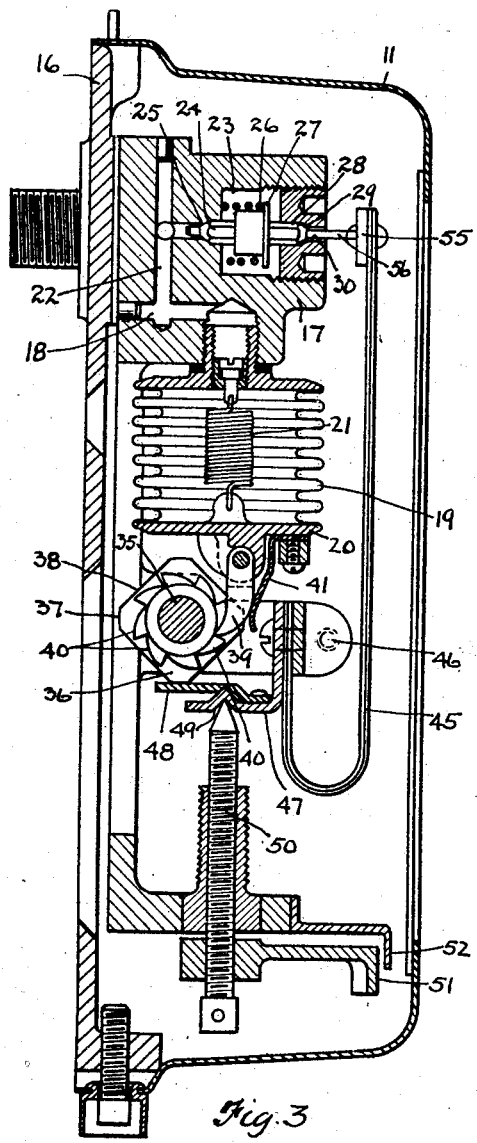
Figure 2:
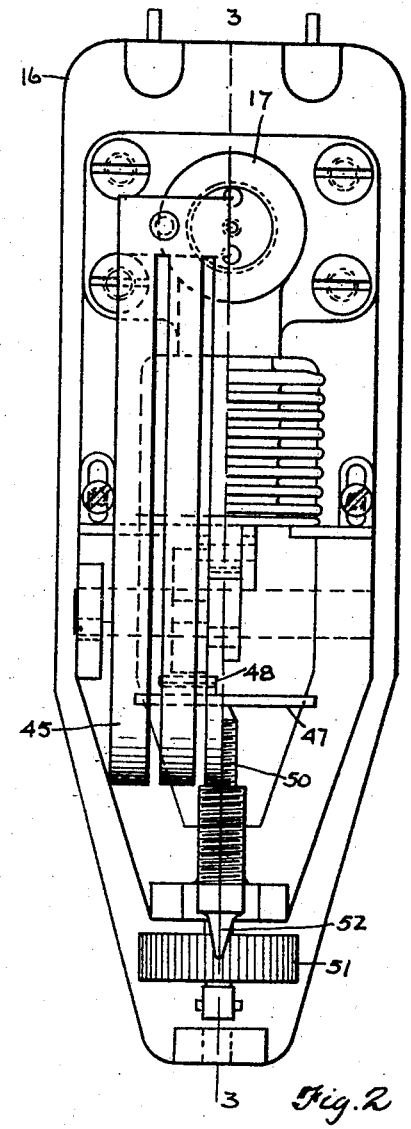
Figure 4:
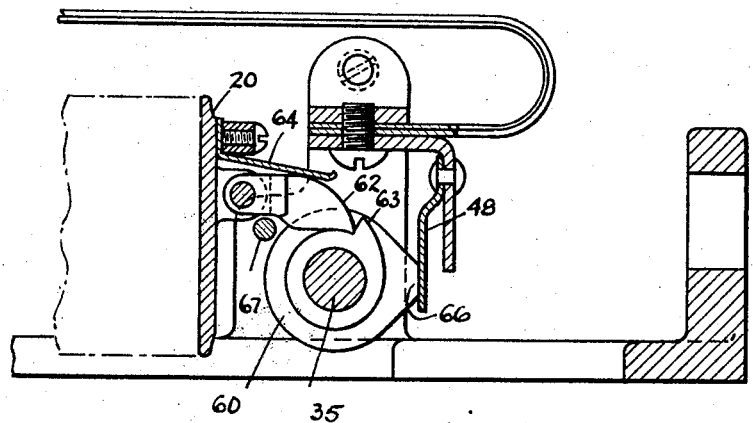
Figure 5:
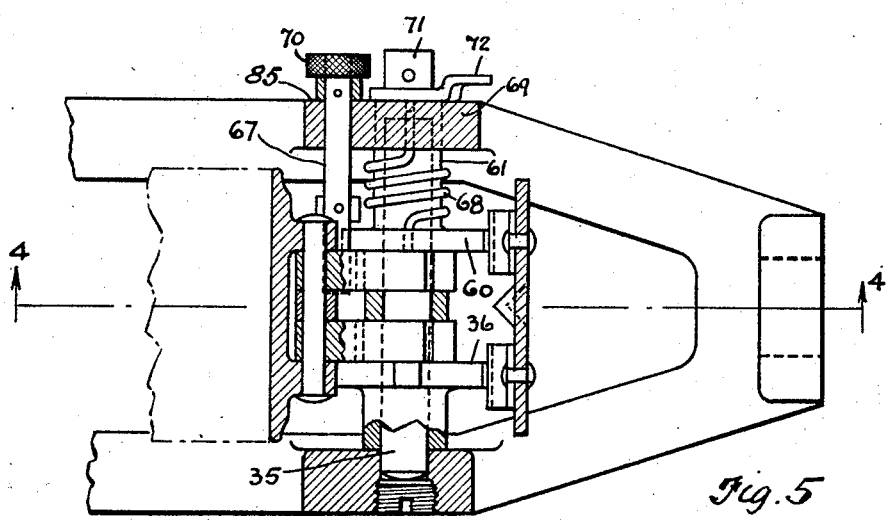
Figure 7:
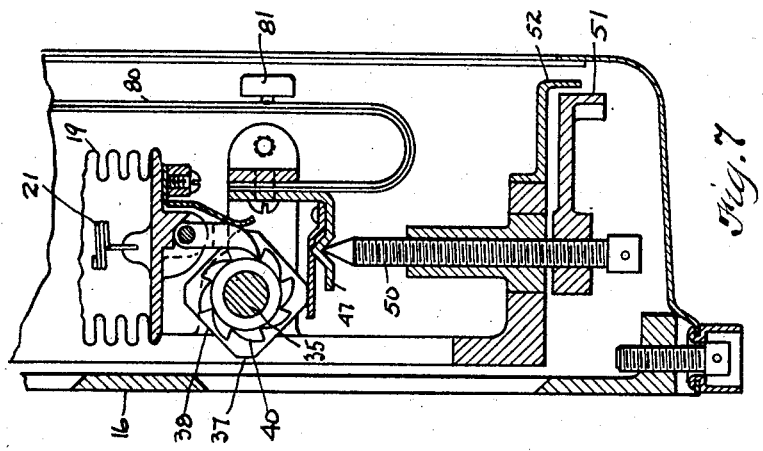
Figure 6:
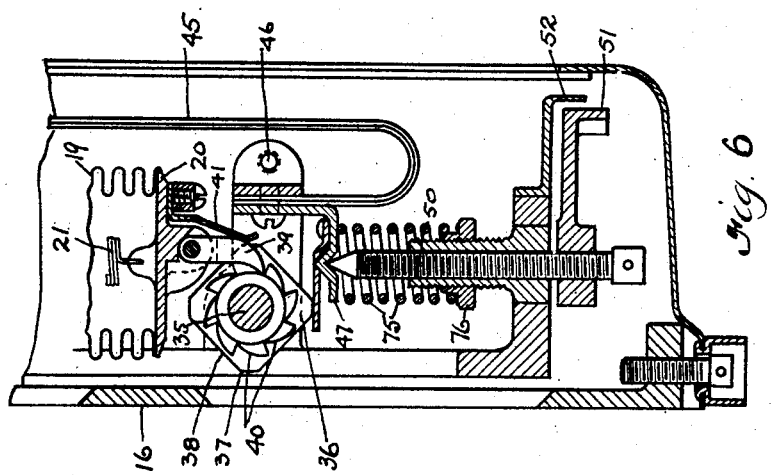
Figure 9:
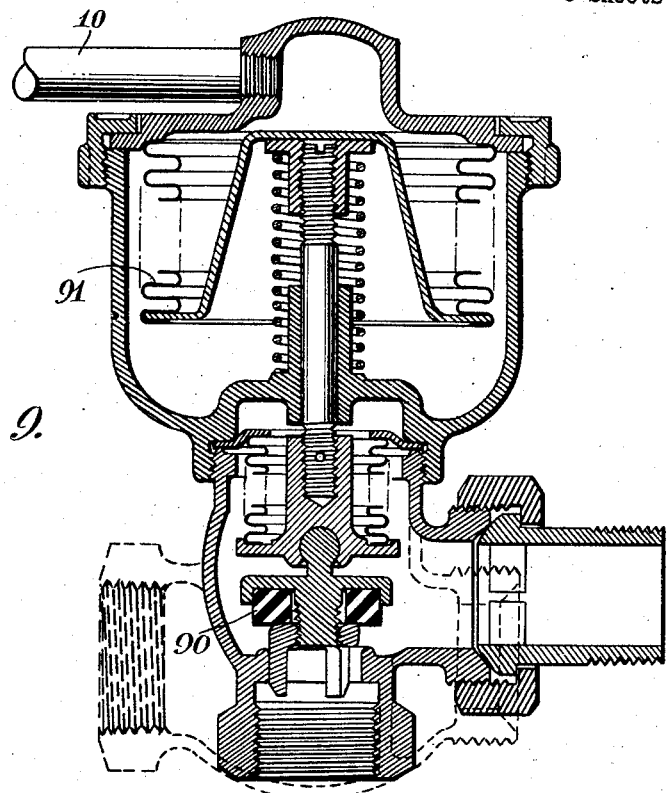
Figure 8:
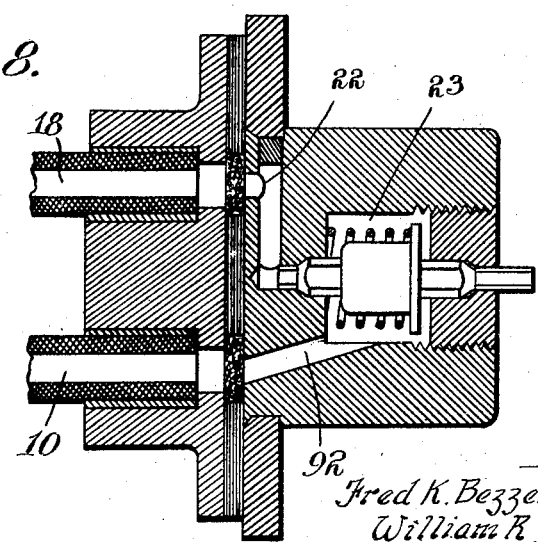

Fig. 1 is a diagrammatic view illustrating the type of system, to the operation of which the present method and apparatus are directed; Fig. 2 is a plan view of our improved thermostat, this view being partially in section; Fig. 3 is a longitudinal section on the line 3—3, Fig. 2; Fig. 4 is a longitudinal section on the line 4—4, Fig. 5; Fig. 5 is a longitudinal horizontal section through a portion of our improved thermostat; Figs. 6 and 7 are views similar to Fig. 3, but showing modifications of the present invention; Fig. 8 is a detail view taken on line 8—8 in Fig. 3; and Fig. 9 is a view in section illustrating a conventional type of combined inlet valve and fluid pressure motor.

In certain public buildings, such as schools, it is desired to heat the entire building in the ordinary way during the day and to then shut down the entire system at night, except for certain rooms which are to be used and which therefore must be heated, in order of course to save the expense of heating the entire number of rooms, including those which are not in use. This result can be secured by various methods, which usually require the employment of fluid pressure operated valves which admit steam to the various radiators, there being of course one or more radiators disposed in each of the rooms in the building. This fluid pressure operated control system is in turn actuated in the various rooms by thermostats responsive to the temperature in each room, so that while the steam line can be opened at a point adjacent to the boiler for allowing steam to flow to all of the radiators, still the steam is not actually admitted to the radiator, and hence the individual room is not heated unless the temperature in that room is below the desired point, which allows the thermostat to effect the operation of the individual valve controlling the radiator in such room to admit steam thereto. In our improved system thermostatic devices are employed which can, to a certain extent, be controlled from a remote point, such as a boiler room, but in which the individual thermostats may also be locked into or out of operation at each room.

Referring now to Fig. 1, we have shown diagrammatically a series of rooms 1, 2 and 3, in which are disposed radiators 4 and 5 which are supplied with steam from a boiler 6 through conduits 7. Each of the radiators 4 and 5 is provided with a valve 8 which controls the flow of steam into the radiator from the steam line, and this valve is operated in turn by means of a fluid pressure motor 9 (in the form of a metallic or other bellows or diaphragm), which is connected to a fluid pressure conduit 10 leading to a reservoir 11, in which the pressure is maintained at a desired amount by means of a compressor 12. Interposed in the branches of the conduit 10, which lead to the individual radiators, are thermostatic devices 15 which control the flow of liquid pressure to the motor 9 for opening or closing the inlet valve 8 to the radiator. In Fig. 9 is illustrated an ordinary form of inlet valve and fluid pressure motor which in the present instance are shown in one assembly, the inlet valve proper being indicated at 90 and the fluid pressure motor in the form of an expansible bellows at 91.

Referring now to Figs. 2 and 3 there is shown a thermostatic device consisting of a base plate 16, in one portion 17 of which is formed a passage which may be connected to the fluid pressure conduit 10. Fluid pressure is admitted through the conduit 10 to a passage 18 into the interior of the metallic bellows 19 mounted on the frame 17, with one end 20 for the purpose of effecting the operation which will presently be described, while the other end of the bellows is fixed to the frame extension 17. This metallic bellows is normally maintained in a contracted condition by means of a spring 21, which is mounted as indicated. Connected to the passage 18 is a second passage 22 leading to a chamber 23. Flow into this chamber from the conduit 22 is controlled by means of a valve 24 operating against a seat 25 and normally maintained off from this seat by means of a coiled spring 26 interposed between one wall of the chamber and the flange 27, which is formed on the central portion of the valve stem. On the other side of the disk 27 there is formed a second valve 28 fitting against a conical seat 29 formed as a part of a vent passage 30 leading to the atmosphere. This double valve operates between the two seats, alternately opening and closing the inlet and exhaust passages from the chamber. The frame 17 as seen in Fig. 8 is provided with two conduits in the rear face thereof, one of which constitutes the inlet 18 communicating to the chamber 23 through the port 22 and the other of which connects the chamber 23 through a passageway 92 to the conduit 10 leading to the fluid pressure motor.

Disposed in front of the movable end 20 of the bellows 19 is a transversely disposed shaft 35, upon one end of which there is rotatably mounted a cam 36 provided with four equidistantly spaced corners 37, and with four intermediate flat faces 38. Pivotally secured to the head 20 of the bellows is a pawl 39, which is normally maintained in engagement with teeth 40 formed on an extension from the cam 36 by means of a flat spring 41, shown in Fig. 3. Cam 36 is designed to control the position of the U-shaped bimetallic thermostatic bar 45, which is pivoted about a transverse axis 46 and is provided with a flange 47 and resilient contact strip or plate 48. The limiting position of the U-shaped bar is determined by the engagement, in a conical seat 49 in the plate 47, of an adjusting screw 50 which is carried in an extension arising from the frame 16, the adjustment being made by means of a dial arm 51 which may be graduated to indicate the various temperatures which will be maintained for various positions of this arm. A pointer 52 is the guide by which the adjustment of the dial arm 51 is made.

The bimetallic thermostatic element 45 is provided at its free end with a transverse plate 55 adapted to engage the stem 56 of the double valve member in the chamber 23, and this thermostatic element is so formed as to have its ends bow toward each other, which will bring the plate 55 into operating engagement with the end of the stem 56 upon a lowering of the temperature, while a raising of the temperature will bow the arms of the bar in opposite directions and relieve the pressure on the stem 56, at that time permitting the spring 26 to cause the valve 28 to seat against the surface 29 and thus close the vent passage from the valve chamber 23.

There is also mounted on the transverse shaft 35 a second cam 60, which is shown in Figs 4 and 5, and this cam is carried on a double sleeve 61, which is rotatably mounted on the shaft 35. The operation of this cam is controlled by means of a second pawl 62, which is also carried by the movable end 20 of the bellows and is maintained in engagement with a tooth 63 formed as a lateral extension upon the cam by means of a second flat spring 64. The cam 60 is provided with but one extending point or surface 66, which engages against the flexible plate 48 secured to the laterally extending arm 47 on one end of the thermostatic bar. Movement of the end 20 of the bellows to the left will retract the pawl 62 and the latter will ride against a longitudinally movable pin 67, which will lift this pawl out of engagement with the tooth 63, at which time a coiled spring 68, having one end fixed in a portion 69 of the frame and the other end held in an opening in the cam 60, will rotate the cam to bring the extending point 66 away from, and out of contact with, the plate 48, this rotation being determined in its extent first by the tension in the spring. It will be obvious that by moving the pin 67 longitudinally until its inner end is out of the plane of the pawl 62 that the pawl 62 will then not ride out of engagement with the tooth 63, but will remain in such engagement, and the pin may be so positioned by means of a knurled nut 70 extending outside of the frame of the base and through an opening formed in the cover 85, which encloses the entire operating mechanism of the thermostat.

As stated hereinbefore, the primary object of the present invention is to provide a simplified type of thermostatic instrument for controlling the flow of air or other operating fluid in a heating system for effecting the operation of various control valves connected between the steam inlet lines and the radiators. It is desired to have each of these thermostatic devices connected in the fluid pressure line, and to provide in connection therewith certain improved mechanism which is adapted to control the operation of the thermostatic element thereof through fluctuations in the pressure of said line.

With reference to Fig. 1 it will be seen that the fluid pressure line 10 is provided with an operating valve 73 adjacent the reservoir 11 and the boiler 6.

The fluctuations in the pressure of line 10 referred to above, are caused by the operation of valve 73 which in one position is adapted to open or vent the pressure in such line between the thermostatic instrument and the valve, and in the other position to supply pressure to the instrument.

In operation the bellows members 19 of each of the thermostatic instruments is controlled through connections 18 in the fluid pressure line by the operation of valve 73. It will be seen therefore that each of the operating bellows members 19, carried in the thermostatic instruments, may be all controlled from a single remote point. When it is desired to shut down the entire heating system in buildings at night it is only necessary to turn the valve 73 to relieve the pressure in the lines 10, it being understood that valve 73 is of the two-way stop and waste cock type, which operation permits the springs 21 to pull the bellows head 20, together with the pawls 39 carried thereby, in a direction away from the cam members 36. Consequently, the pawls 39 will become engaged behind the next tooth 40 and when the pressure is again turned into the lines 10 the expansion of bellows 19 will move the cam members 36 so that the flat sides 38 thereof will be presented to the lateral projections 47 on the thermostatic elements 45, in which position, as has been previously described, such thermostatic elements are inoperatively positioned with respect to the valve stem 56. Thus, by a single operation at a remote point each of the various thermostatic instruments in a heating system may be simultaneously turned off.

When it is desired to heat certain rooms in such system after they have been turned off for the night the present novel thermostatic instrument may be set by means of a key 72 inserted over a projection 71 provided on sleeve 61 to bring the cam member 60 in engagement with the projection 48 of the thermostatic element 45. In this manner any one of the thermostatic instruments may be turned on at will, the same being restored to normal condition at the next fluctuation in the pressure of the fluid line by the release of the pawl 62 from such cam member 60, as has been hereinbefore described.

In Fig. 6 is shown a device similarly constructed to the one shown in Fig. 3, with the exception that a compression spring 75 is provided between the lateral projection 47 on the thermostatic element 45 and an adjustable nut 76 provided on the adjusting screw 50. In Fig. 3 the thermostatic element 45 is moved in operative position by gravity, while in the present figure the spring 75 serves to positively move such element about its pivot and the upper end thereof away from the valve stem 56.

Similarly, Fig. 7 discloses a modified form of means for moving the thermostatic element 80 about its pivot to inoperative position, the same being shown in the form of a weight 81.

Other modes of applying the principle of our invention may be employed instead of the one explained, change being made as regards the mechanism herein disclosed provided the means stated by any of the following claims or the equivalent of such stated means be employed.

We therefore particularly point out and distinctly claim as our invention.

1. In a heating system, the combination of a valve controlling a heating conduit, a fluid pressure motor connected to operate said valve, a second valve controlling the flow of fluid pressure to said motor, a thermostatic element controlling the action of said second valve, a pressure responsive device actuated by fluid pressure, and connections between said device and said thermostatic element, said connections including means for inoperatively positioning said thermostatic element with respect to said second valve upon periodical actuations of said pressure responsive device.

2. In a heating system, the combination of a valve controlling a heating conduit, a fluid pressure motor connected to operate said valve, a second valve controlling the flow of fluid pressure to said motor, a thermostatic element controlling the action of said second valve, a pressure responsive device actuated by fluid pressure, and connections between said device and said thermostatic element, said connections including means adapted to engage said thermostatic element to hold the same in operative position, and means actuated by the actuations of said pressure responsive device for rendering said thermostatic element inoperative.

3. In a heating system, the combination of a valve controlling a heating conduit, a fluid pressure motor connected to operate said valve, a second valve controlling the flow of fluid pressure to said motor, a thermostatic element controlling the action of said second valve, a pressure responsive device actuated by fluid pressure, connections between said device and said thermostatic element, said connections including means adapted to engage said thermostatic element to hold the same in operative position, and means carried by said pressure responsive device adapted to engage said first named means upon alternate actuations of said device and render said thermostatic element inoperative.

4. In a device of the character described, the combination of a valve, a thermostatic element for controlling said valve, a pressure responsive device actuated by fluid pressure, and connections between said thermostatic element and said pressure responsive device, said connections including means operated by the actuations of said pressure responsive device for periodically rendering said thermostatic element inoperative with respect to said valve.

5. In a device of the character described, the combination of a valve, a thermostatic element for controlling said valve, a pressure responsive device actuated by fluid pressure, connections between said thermostatic element and said pressure responsive device, said connections including a cam member adapted in one position to hold said thermostatic element in operative relation with said valve, and means operated by the periodical actuation of said pressure responsive device for moving said cam to render said thermostatic element inoperative.

6. In a device of the character described, the combination of a valve, a pivotally mounted thermostatic element for controlling said valve, a pressure responsive device actuated by fluid pressure, and connections between said pressure responsive device and said thermostatic element adapted to move the latter in operative position with respect to said valve, said connections being adapted upon periodical actuations of said pressure responsive device to inoperatively position said thermostatic element.

7. In a device of the character described, the combination of a valve, a spring controlling the movement thereof in one direction, a theremostatic element controlling the reverse movement of said valve, a pressure responsive device, and means operable upon periodical actuation of said device to alternately move said thermostatic element into and out of operative relation with respect to said valve.

8. In a device of the character described, the combination of a valve, a spring controlling the movement thereof in one direction, a pivotally mounted theremostatic element controlling the movement thereof in the reverse direction, a pressure responsive device, and connections between said device and said thermostatic element, said connections including means inoperatively positioning said thermostatic element with respect to said valve upon periodical actuation of said pressure responsive device.

9. In a device of the character described, the combination of a valve, a thermostatic element for controlling the action of said valve, a projection on said thermostatic element, a pressure responsive device, a rotatable member mounted adjacent said projection adapted to move said thermostatic element into and out of operative relation with said valve, and means carried by said pressure responsive device adapted to actuate said member upon periodical actuations of said device.

10. In a device of the character described, the combination of a valve, a thermostatic element for controlling the action of said valve, a resilient projection on said thermostatic element, a pressure responsive device, a rotatable member mounted adjacent said projection adapted to alternately actuate said thermostatic element into and out of operative relation with respect to said valve, and means operable upon periodical actuations of said pressure responsive device to rotate said member.

11. In a device of the character described, the combination of a valve, a thermostatic element for controlling the action of said valve, a pressure responsive device, a cam adapted to periodically engage said thermostatic element whereby the latter is actuated into and out of operative relation with respect to said valve, and means actuated by said pressure responsive device for operating said cam.

12. In a device of the character described, the combination of a valve, a thermostatic element for controlling the action of said valve, a projection on said thermostatic element, a cam member engaging said projection whereby the latter is periodically actuated to move said thermostatic element out of operative position with respect to said valve, and fluid pressure actuated means for actuating said cam.

13. In a heating system, the combination of a valve controlling a heating conduit, a fluid pressure motor connected to operate said valve, a second valve controlling the flow of pressure to said motor, a thermostatic element controlling the action of said second valve, a pressure responsive device actuated by fluid pressure, connections between said device and said thermostatic element, said connections including means for inoperatively positioning said thermostatic element with respect to said second valve upon periodical actuations of said pressure responsive device, and manually operated means for operatively positioning said thermostatic element with said second valve.

14. In a heating system, the combination of a valve controlling a heating conduit, a fluid pressure motor connected to operate said valve, a second valve controlling the flow of fluid pressure to said motor, a thermostatic element controlling the action of said second valve, a pressure responsive device actuated by fluid pressure, connections between said device and said thermostatic element, said connections including means for inoperatively positioning said thermostatic element with respect to said second valve upon periodical actuations of said pressure responsive device, and manually operated means for operatively positioning said thermostatic element with said second valve, said last-named means being actuated to inoperative position by said pressure responsive device.

15. In a heating system, the combination of a valve controlling a heating conduit, a fluid pressure motor connected to operate said valve, a second valve controlling the flow of fluid pressure to said motor, a thermostatic element controlling the action of said second valve, a pressure responsive device actuated by fluid pressure, and manually operated means for permanently locking said thermostatic element against the action of said pressure responsive device.

16. In a device of the character described, the combination of a valve, a thermostatic element for controlling the action of said valve, said thermostatic element being normally held by gravity out of operative position, a pressure responsive device, and connections between said device and said thermostatic element, said connections including means for operatively positioning said thermostatic element with respect to said valve upon periodical actuations of said pressure responsive device.

17. In a device of the character described, the combination of a valve, a thermostatic element for controlling the action of said valve, means for normally holding said thermostatic element out of operative position with respect to said valve, a pressure responsive device, and connections between said device and said thermostatic element, said connections including means for operatively positioning said thermostatic element with respect to said valve upon periodical actuation of said pressure responsive device.

Signed by us, this 25th day of November, 1924.

WILLIAM R. ZIMMERMAN.
FRED K. BEZZENBERGER.